(12) United States Patent
Earhart

(10) Patent No.: US 7,492,691 B2
(45) Date of Patent: Feb. 17, 2009

(54) SUPPLEMENTAL MEMORY HAVING MEDIA DIRECTORY

(75) Inventor: Tod Earhart, Mead, CO (US)

(73) Assignee: InPhase Technologies, Inc., Longmont, CO (US)

( * ) Notice: Subject to any disclaimer, the term of this patent is extended or adjusted under 35 U.S.C. 154(b) by 1192 days.

(21) Appl. No.: 10/757,855

(22) Filed: Jan. 14, 2004

(65) Prior Publication Data

US 2004/0194151 A1 Sep. 30, 2004

Related U.S. Application Data

(60) Provisional application No. 60/440,862, filed on Jan. 15, 2003.

(51) Int. Cl.
*G11B 7/00* (2006.01)

(52) U.S. Cl. ............ 369/103; 359/22; 359/11; 359/3

(58) Field of Classification Search ........... 369/103, 369/30.4, 112.01, 262; 359/3, 22, 25, 11, 359/24, 35, 1; 360/92.1, 133; 380/201, 44; 725/135, 136; 365/125
See application file for complete search history.

(56) References Cited

U.S. PATENT DOCUMENTS

| | | | |
|---|---|---|---|
| 5,526,337 A * | 6/1996 | Housey et al. ............ 369/103 |
| 5,719,691 A * | 2/1998 | Curtis et al. ............ 359/11 |
| 5,862,117 A | 1/1999 | Fuentes et al. |
| 5,932,045 A | 8/1999 | Campbell et al. |
| 6,081,857 A | 6/2000 | Frary |
| 6,095,445 A | 8/2000 | Hentrich |
| 6,101,009 A | 8/2000 | Linke et al. |
| 6,103,454 A | 8/2000 | Dhar et al. |
| 6,201,474 B1 | 3/2001 | Brady et al. |
| 6,466,990 B2 | 10/2002 | Frary |
| 6,486,780 B1 | 11/2002 | Garber et al. |
| 6,512,606 B1 | 1/2003 | Lipson et al. |
| 2003/0025955 A1 | 2/2003 | Curtis |

OTHER PUBLICATIONS

International Search Report mailed Oct. 18, 2004, for PCT Application No. PCT/US04/01054 filed Jan. 14, 2004, 4 pages.

AMTEL Corporation (Oct. 2003). "AMTEL2-Wire Serial EEPROM," AMTEL, pp. 1-20.

(Continued)

*Primary Examiner*—Ali Neyzari
(74) *Attorney, Agent, or Firm*—Morrison & Foerster LLP

(57) ABSTRACT

Disclosed is a holographic data storage device including holographic media for containing data, writing data to and reading data from. The storage device also includes at least one supplemental memory for containing at least a portion of a directory of the data contained in the holographic media. By locating directory information for the holographic media in a supplemental memory, areas of the holographic media that have not yet been written to can be determined prior to accessing the holographic media. In this way, activating photosensitive agents in unwritten areas of the holographic media can be avoided unless these areas are being written to.

16 Claims, 9 Drawing Sheets

OTHER PUBLICATIONS

Hitachi Maxell, Ltd. (Jan. 2004). "Maxell RFID System Coil-on-Chip: The Contactless Solutions," located at <http://www.maxell.com/Home/rfid/coc.html> last visited on Jan. 7, 2004, four pages.

Hitachi Maxell, Ltd. (Oct. 2002) "Maxell Coil-on-Chip RFID System, UART R/W Module, ME-M1000-UART-0001/0002" Maxell Manual, 36 pages.

Mok, F. et al. (2000). "Holographic Read-Only Memory" In *Holographic Data Storage* Coufal, H.J. et al. eds. Springer-Verlag, pp. 399-407.

Redfield, S. (2000). "Tamarack Optical Head Holographic Storage" In *Holographic Data Storage* Coufal, H.J. et al. eds., Springer-Verlag, pp. 343-357.

* cited by examiner

SUPPLEMENTAL MEMORY HAVING MEDIA DIRECTORY

CROSS-REFERENCE TO RELATED APPLICATIONS

This application claims priority to U.S. provisional patent application Ser. No. 60/440,862 files Jan. 15, 2003, which is hereby incorporated by reference in its entirety.

BACKGROUND OF THE INVENTION

Holographic media is rapidly developing as a medium for mass storage of data. Because holographic media is capable of storing relatively large amounts of data it is necessary to be able to index holographic media to be able to locate specific data stored thereon and/or determine various parameters about the data and/or storage medium.

One type of holographic storage device that includes holographic media is a cartridge that contains a spinning, circular disk having holographic media. Laser light can be projected onto the media to form holographic images in the media that contain data. When reading the holographic media, a reference laser beam illuminates the media to read out the holographic data.

Often, any particular area of holographic media in such storage devices can be read many times but written to only once. That is, the media is "write-once" holographic media. It is also the case, however, that there is typically enough media space in such holographic storage devices that that a single device can be used for many storage sessions, with additional data being written to the holographic media during each session. For such multi-session use, it is important to index, or provide a directory for, data that is written to the media during each session. Such an index or directory includes information that allows particular data written to the media to be located on the media.

For non-holographic media written to over multiple sessions, such directories are typically maintained in one of two ways. First, a session directory can be generated after each write session that indexes the data written to during that write session. Each of the session directories typically would include a pointer to the previous session directory. In order to locate information one the storage device, each session directory would be searched. A second way to index multi-session, non-holographic media is to generate a complete volume directory after each write session that includes an index of each of the sessions ever written to the disk. This can be accomplished by, after each write session, copying the previous volume directory and appending an index from the most recent write session.

Each of these methods of maintaining a volume directory requires searching the media in the volume to be sure that all of the data has been indexed (either directly or with pointers) in the most recent directory. If a volume is not fully written to, this involves reading past the end of data stored in the media, that is reading into portions of the media that have not been written to, in order to be sure that all data has been indexed.

Current storage devices can also allow the host to request reads beyond the end of data without checking the directory to see if data is present there. If there is no data or it does not pass a checksum, an error is returned.

In storage devices using non-holographic media, this is not a significant issue. When using holographic media, however, reading into a portion of the media that has not been written to can present some difficulty. In particular, holographic media includes photosensitive agents that are activated when exposed to light. If areas of the media are exposed to a reference beam before being written to, the photo-sensitive agents in the media can be activated and the media's dynamic range, and thus storage capacity, can be undesirably reduced.

BRIEF SUMMARY OF THE INVENTION

Described herein is a holographic data storage device including holographic media for containing data, writing data to and reading data from. The storage device also includes at least one supplemental memory for containing at least a portion of a directory of the data contained in the holographic media. By locating directory information for the holographic media in a supplemental memory, areas of the holographic media that have not yet been written to can be determined prior to accessing the holographic media. In this way, activating photo-sensitive agents in unwritten areas of the holographic media can be avoided unless these areas are being written to. Also, the storage device can validate read requests from the host destined for unwritten areas and reject them before reading the media.

It is also considered that the portion of the directory, such as a media map, be included in the holographic media and the portion of the directory on the supplemental memory include pointers to the portion of the directory in the holographic media. Additionally, the supplemental memory may include security information to prevent unauthorized access to the data in the holographic media as well as identification information for the holographic media.

In another aspect of the present invention, a method of managing the contents of a holographic storage device includes storing data in a holographic media and storing at least a first portion of a directory for the data in the holographic media in a supplemental memory located adjacent to the holographic media.

DETAILED DESCRIPTION OF THE PREFERRED EMBODIMENTS

Figure 1:
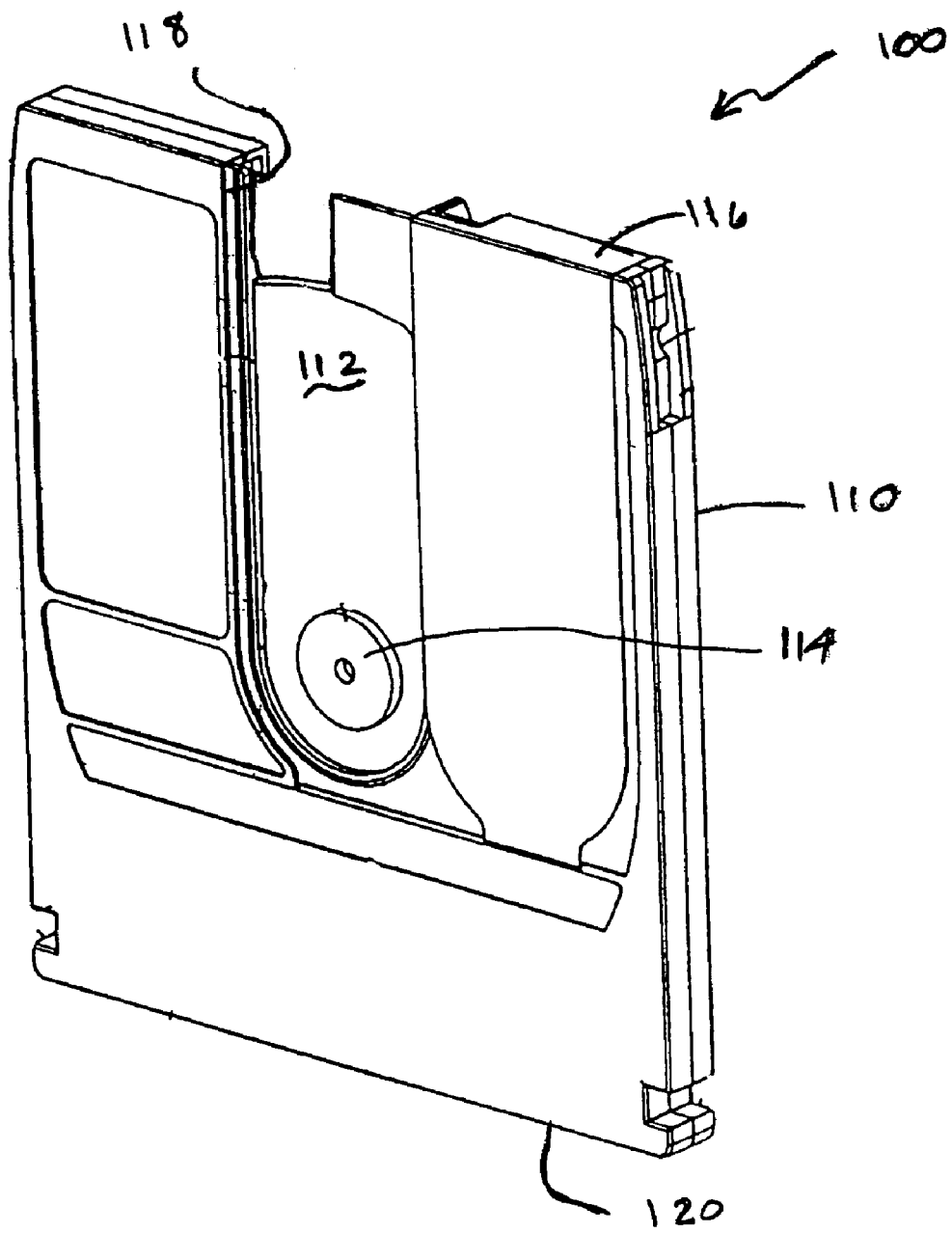
FIG. 1 is a diagram of an exemplary holographic media cartridge which may include a supplemental memory in accordance with the present invention.

FIG. 1 illustrates an example of a storage cartridge 100 containing holographic media that data can be written to and read from. Storage cartridge 100 includes a housing 110, which can be formed from metal, plastic or other rigid material. Housing 110 contains circular holographic media 112 mounted on a spindle 114 to allow holographic media 112 to spin inside of housing 110. As is understood by those skilled in the art, holographic media 112 includes photosensitive agents which allow holograms to be recorded therein, as is well understood in the art. Examples of holographic media suitable for use in a cartridge 100 are disclosed, for example, in U.S. Pat. Nos. 6,103,454 and 5,932,045 which are both hereby incorporated by reference in their entirety. Cartridge 100 also includes a shutter 116 that can close over an opening 118 in cartridge 100. Opening 118 allows media 112 to be accessed by a light beams to generate holograms in media 112 and read holograms therefrom when shutter 116 is in the open position (as shown in FIG. 1). Shutter 116 can also be closed to cover and protect holographic media 112. Cartridges including holographic media are known in the art and disclosed, for example, in H. J. Coufal et. al, Holographic Data Storage C. Springer-Verlag 2000, p. 349-49, which is hereby incorporated by reference herein in its entirety. Holographic drives suitable for reading holographic media in cartridge 100 is disclosed, for example, in commonly owned U.S. patent application Ser. No. 10/146,085 for "Method and Apparatus for Phase Correlation Holographic Drive", and H. J. Coulfal et. al, Holographic Data Storage C. Springer-Verlag 2000, pp. 343-357 and 399-407 both of which are hereby incorporated by reference in their entirety. Cartridge 100 is only an exemplary storage cartridge that can be used in accordance with the present invention. It is considered that any data storage device including holographic media may be used in accordance with the present invention.

Figure 2:
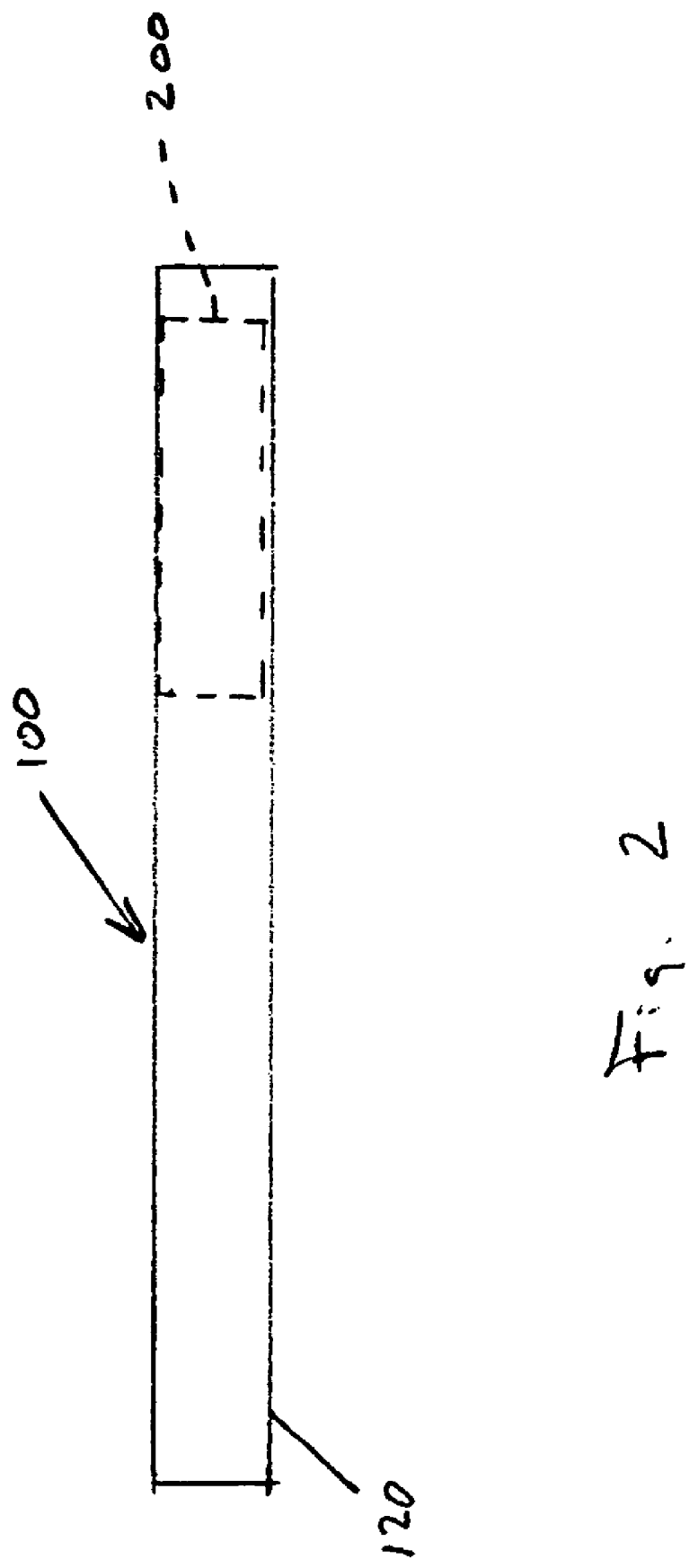
FIG. 2 is a view of an end face of the media cartridge shown in FIG. 1 having a supplemental memory card mounted to an interior surface thereof in accordance with the present invention.
Figure 3:
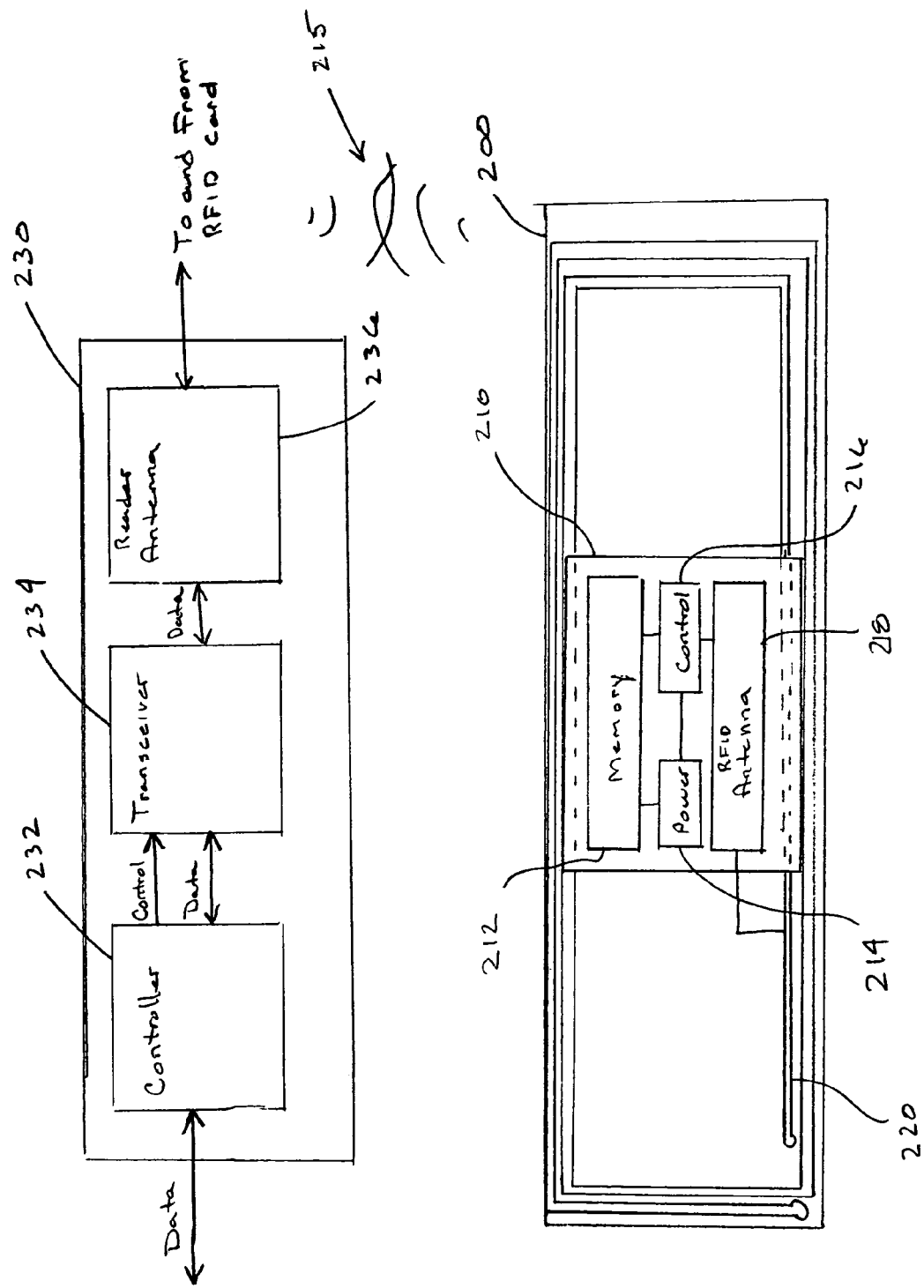
FIG. 3 is a diagram of an exemplary supplemental memory card and supplemental memory card reader which can communicate via radio frequency signals in accordance with the present invention.

As shown in FIG. 1, cartridge 100 includes an end face 120 opposite to the end face of cartridge 100 including opening 118. FIG. 2 illustrates end face 120 of cartridge 100. Preferably, as shown, a radio frequency identification ("RFID") board 200 is mounted, using any appropriate adhesive or by any other means, at the interior of end face 120. FIG. 3 illustrates a preferred embodiment of RFID board 200 and RFID reader card 230 which can both read from and write to RFID board 200. Board 200 includes an RFID chip 210 and a coil 220, which acts as an antennae, interconnected with RFID chip 210.

RFID chips such as RFID chip 200 are well known in the art and can include, as shown in FIG. 3, a memory section 212, a power section 214, a control section 216 and an RFID antenna 218. Power section 214 provides power to memory section 212 and control section 216. Control section 216 controls where data is written to and read from in memory section 212 and memory section 212 stores the data. Memory section 212 is preferably a non-volatile memory such as flash memory, EEPROM, or any other non-volatile memory. Memory section 212 preferably includes from 64 bytes to 256 bytes but may be either larger or smaller. RFID card preferably includes a coil 220 interconnected with RFID antenna 218 to boost signal strength of both transmitted and received signals. RFID antenna 218 receives data to be stored in memory section 212 from coil 220 and provides data stored in memory section 212 to coil 220. Coil 220 wirelessly receives data to be stored in memory section 212 via RF signals 215 from a reader antenna 236 of reader card 230 and wirelessly transmits data read from memory section 212 via RF signals 215 to reader antenna 236.

Reader card 230 includes a controller 232, transceiver 234 and, as noted above, reader antenna 236. Data to be written to memory section 212 of RFID card 200 is fed into controller 232 which feeds the data into transceiver 234 and controls the operation of transceiver 234 to either transmit data to be written to memory section 212 or receive data read from memory section 212 via RF signals 215 to and from reader antenna 236. When data is to be read from memory 212, controller 232 directs transceiver 234 to access memory section 212 via reader antenna 236 and control section 216 to read data from memory section 212. RFID chips, such as RFID chip 200 and RFID readers such as reader card 230, and reading and writing data to and from RFID chips using an RFID reader is well understood in the art. RFID chips and RFID readers are commercially available from, for example, Maxell Corporation of America having offices in Colorado and New Mexico. One example of a RFID chip that can be used with the present invention is available from Maxell® Corporation of America under the designation ME-Y1001. One example of an RFID reader card that can be used with the present invention is available from Maxell® Corporation of America under the designation "Picochet".

Figure 4:
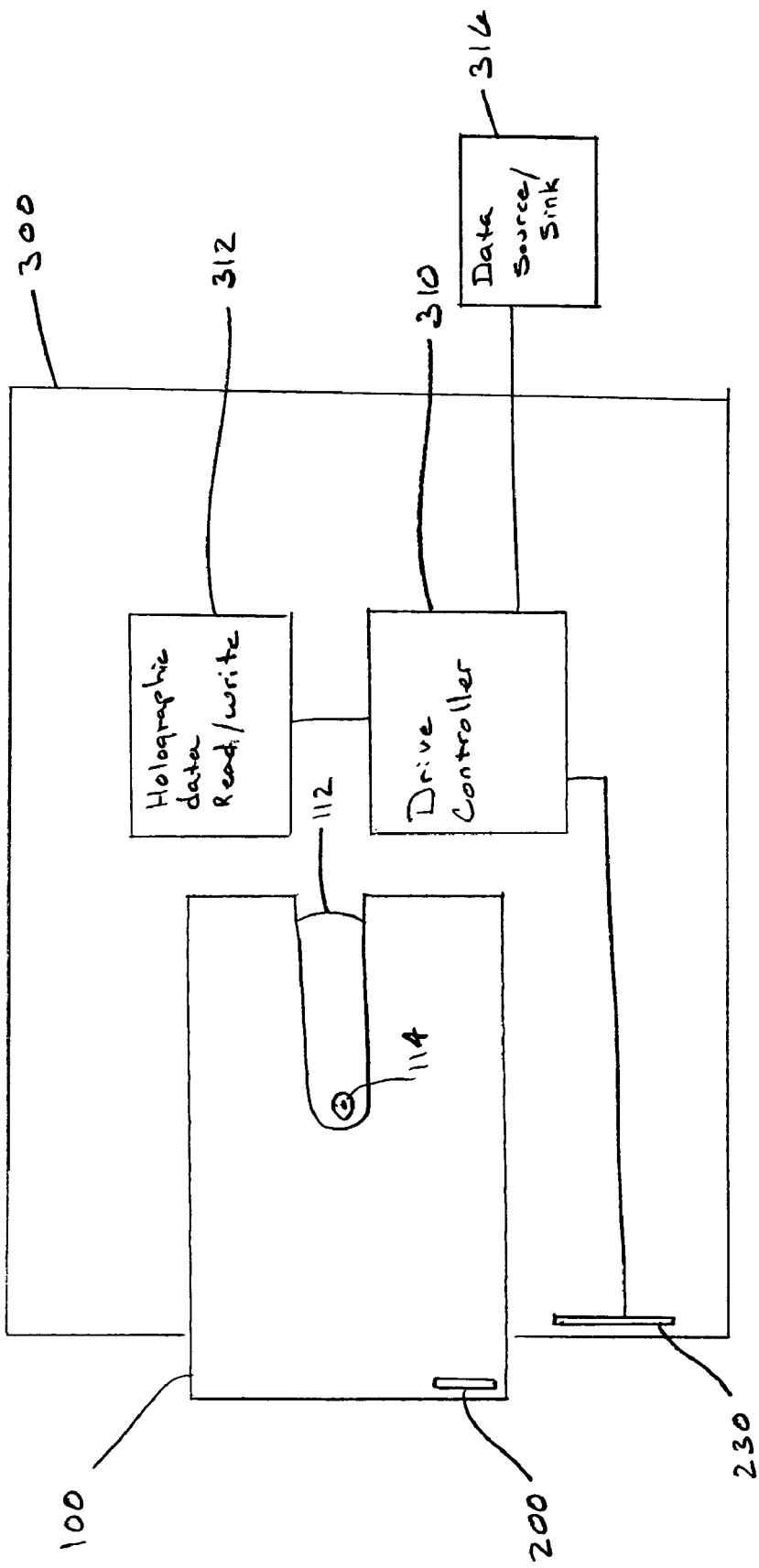
FIG. 4 is a diagram of the holographic cartridge shown in FIG. 1 inserted into a holographic disk drive including a supplemental memory reader/writer in accordance with the present invention.

FIG. 4 illustrates holographic storage cartridge 100 inserted into a disk drive 300. The details of the holographic writing and reading apparatus in disk drive 300 have been omitted for clarity. As noted above, apparatuses and methods for writing and reading holographic data to and from holographic media are well understood in the art. As discussed above, storage cartridge 100 includes holographic media 112 rotating on a spindle 114 and RFID card 200. Disk drive 300 includes a drive controller 310 which is connected to an external data source/sink 316 which may be, but need not be, a standard PC. Disk drive 300 also includes RFID reader 230. External data source/sink 316 provides data to be stored in storage cartridge 100 by disk drive 300. This data is provided to drive controller 310 which in turn, as will be discussed in detail below, provides it to holographic read/write control 312. As is understood in the art, holographic read/write control 312 controls holographic optics (not shown) to write the provided data to holographic media 112. Data can also be requested from storage cartridge 112 by external data source/sink 316 via drive controller 310. When data is requested, as will be discussed in detail below, drive controller 310 provides addressing information to data read/write control 312 to retrieve the requested data and provide it, via drive controller 310, to external data source/sink 316. As will be discussed in detail below, RFID reader 230 provides directory information to and reads directory information from RFID card 200, that is it accesses RFID card 200, in cartridge 100.

Figure 5:
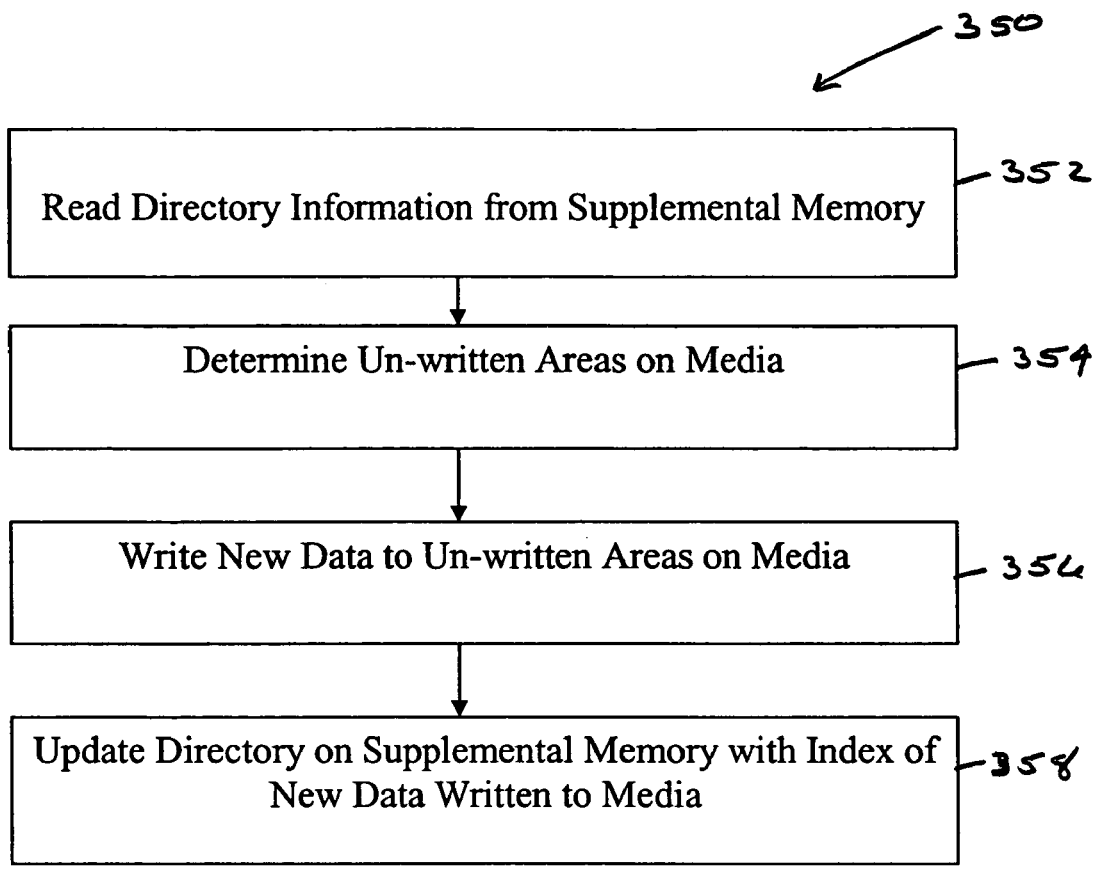
FIG. 5 is a flow diagram illustrating a method of writing data to holographic media using a directory on a supplemental memory in accordance with the present invention.

FIG. 5 is a flow chart illustrating a one embodiment of a method 350 of writing data to media 112 of cartridge 100. Cartridge 100 is preferably inserted into drive 300 and data source 316 makes a write request for data to drive controller 310. In step 352, drive controller 310 activates reader 230 to read directory information from RFID card 210. Drive controller 310 then stores this directory information, preferably in RAM (not shown) available to controller 310, in drive 300. This step is preferably carried out only once after a cartridge 100 is placed into drive 300. The directory information stored, and updated, in drive 300 is then used for subsequent reads and writes. In step 354, based on the directory information received from RFID card 210, it is determined in controller 310 what areas of media 112 are not yet written to. This step advantageously can allow areas of media 112 not yet written to avoid being exposed to a reference beam which would, as discussed above, undesirably reduce the storage capacity of media 112. Directory structures for providing a physical location for data on a storage device are well understood in the art and typically include a media map, which provides a physical location for all data on a disk. In accordance with the present invention, the media map may either be located in the memory 212 of RFID card 210, or memory 212 may simply include pointers to the location of the media map which may be stored in holographic media 112. Pointers to a disk location are also well understood in the art. In step 356, controller 310 accesses holographic data read/write control 312 to write the data provided by data source/sink 316 to media 112. In step 358, controller 310 accesses RFID reader 230 to update directory information, discussed further below, contained in RFID card 200. As is understood in the art, such updating may include either rewriting the entire directory structure or may include just appending the directory information from the most recent write to the preexisting directory structure. Controller 310 can also update the version of the directory acquired in step 352 and stored in RAM (not shown) of drive 300.

Figure 6:
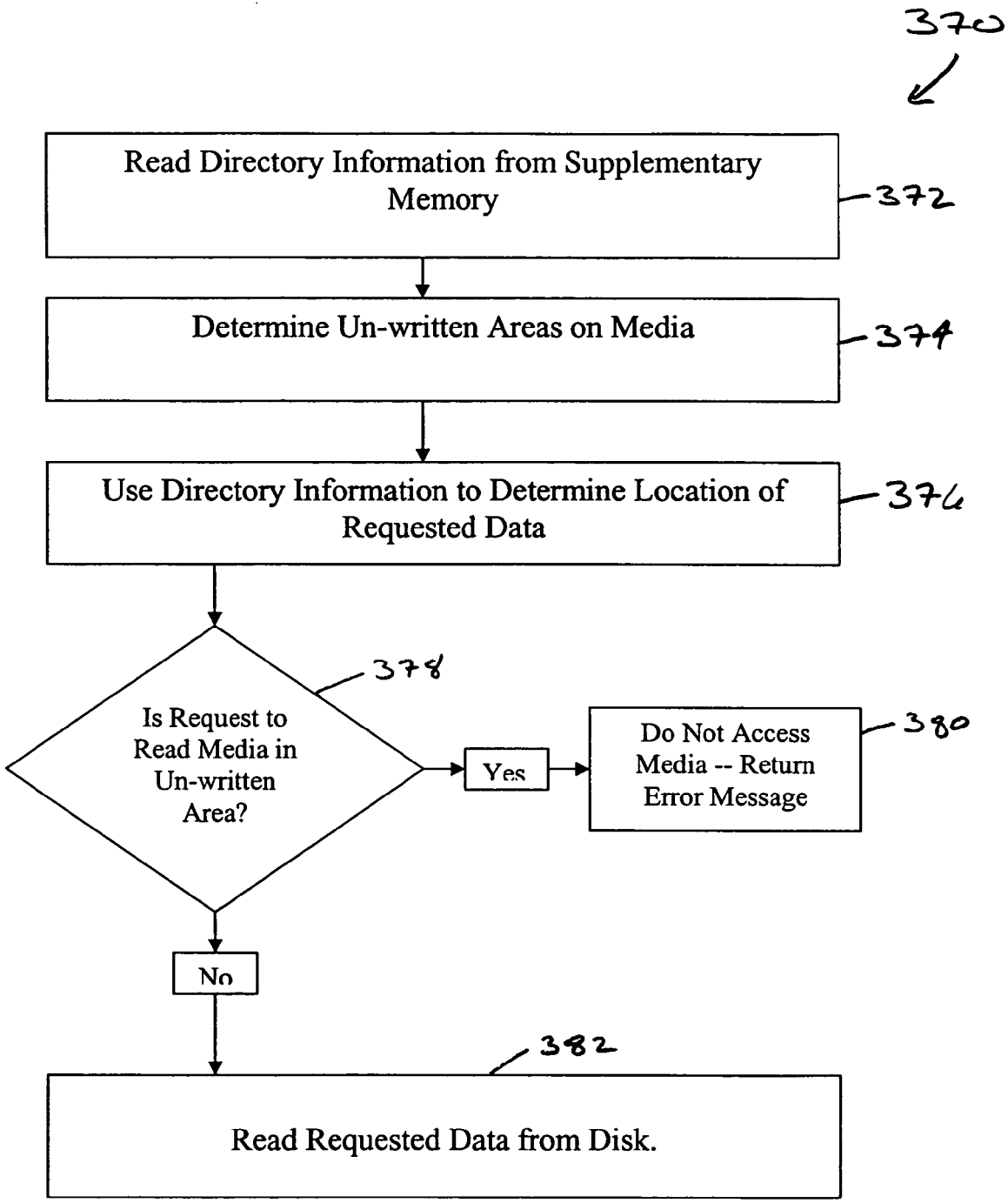
FIG. 6 is a flow diagram illustrating a method of reading data from holographic media using a directory using a directory on a supplemental memory in accordance with the present invention.

FIG. 6 is a flow chart illustrating one embodiment of a method 370 of reading data from cartridge 100. Cartridge 100 is preferably inserted into drive 300 and data source 316 makes a read request for data to drive controller 310. In step 372, drive controller 310 activates reader 230 to read directory information from RFID card 210. Drive controller 310 then stores this directory information, preferably in RAM (not shown) available to controller 310, in drive 300. This step is preferably carried out only once after a cartridge 100 is placed into drive 300. The directory information stored, and updated, in drive 300 is then used for subsequent reads and writes. In step 374 it is determined in controller 310 what areas of media 112 are not yet written to. This step advantageously can allow areas of media 112 not yet written to avoid being exposed to a reference beam which would, as discussed above, undesirably reduce the storage capacity of media 112. Directory structures for providing a physical location for data on a storage device are well understood in the art and typically include a media map, which provides a physical location for all data on a disk. In accordance with the present invention, the media map may either be located in the memory 212 of RFID card 210, or memory 212 may simply include pointers to the location of the media map which may be stored in holographic media 112. Pointers to a disk location are also well understood in the art. In step 376, controller 310 uses the retrieved directory information to determine the location on media 112 of the data requested by data source/sink 316. It is then determined, in step 378, whether the request was to read an area of the media that has not yet been written to. If this is the case, then in step 380, the media is not accessed and an error message is returned to data source/sink 316. This prevents un-written areas of the media from be accessed by a request to access such an area. If the request is to read an area of the disk that has been written to, then, in step 382, the requested data is read from media 112. Because the directory information was acquired from RFID card 200, this can be accomplished without exposing to a reference beam any areas of media 112 that have not yet been written to.

Communication protocols between data source/sink 316, controller 310, holographic data read/write control 312, RFID reader 230 and RFID card 200 for carrying out methods 350 and 370 are well understood in the art. Additionally, data structures for indexing the location of data on media 112 are also well understood in the art and discussed further below.

Figure 7:
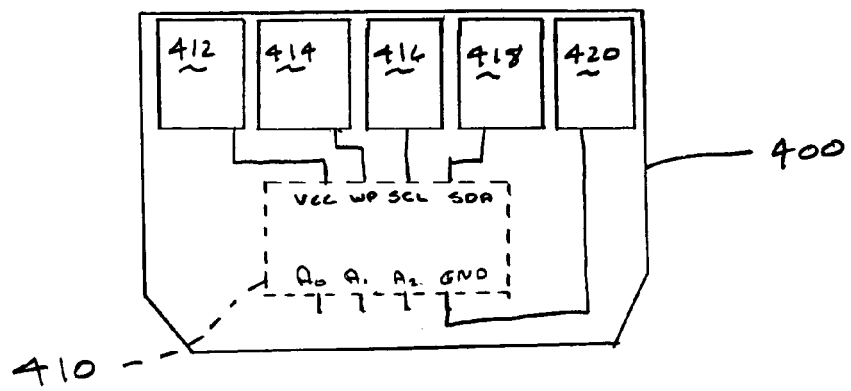
FIG. 7 is a diagram of an exemplary supplemental memory card including electrical contact pads for use in accordance with the present invention.

It is also within the ambit of the present invention to use an EEPROM memory as the supplemental directory that makes mechanical contact with a reader in a drive rather than radio frequency contact. FIG. 7 illustrates a supplemental memory board 400 including an EEPROM chip 410 mounted on a rear side of the board and 5 contact pads 412, 414, 416, 418 and 420 which are connected, as described below, with the pins of EEPROM chip 410. In the example shown, EEPROM chip 410 includes 8 pins. Address pins A0, A1 and A2 are preferably not used. Ground pin GND is connected to pad 420, serial data pin SDA is connected to pad 418, serial clock input pin SCL is connected to pad 416, write protect pin WP is connected to pad 414 and power pin Vcc is connected to pad 412. The use and configuration of pins GND, SDA, SCL, WP and Vcc for accessing and controlling EEPROM chip 410 are well understood in the art. EEPROM chip such as EEPROM chip 410 are available from Atmel® Corporation, of San Jose, Calif. under the designation AT24C32A and AT24C64A.

Figure 8:
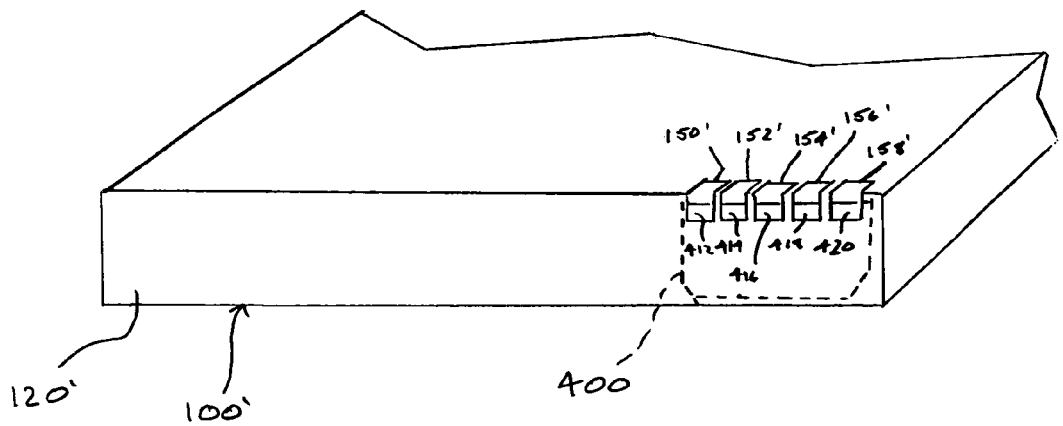
FIG. 8 is a diagram of a end portion of a holographic storage cartridge including a supplemental memory card as shown in FIG. 7.

FIG. 8 illustrates a preferred method for including supplemental memory board 400 into a holographic storage cartridge 100', which can be substantially similar to storage cartridge 100 discussed above. Storage cartridge 100' includes a rear face 120' having 5 openings, 150', 152', 154', 156' and 158' in an upper edge thereof. Supplemental memory chip 400 can be mounted to the interior surface of rear face 120' such that pad 412 is exposed through opening 150', pad 414 is exposed through opening 152', pad 416 is exposed through opening 154', pad 418 is exposed through opening 156' and pad 420 is exposed through opening 158'. In this way, pins located in a holographic disk drive reader such as disk drive 300 discussed above can contact pads 412 through 420 to control, and write and read data to and from EEPROM chip 410. Such control and writing and reading of data to EEPROM chips is well understood in the art. It is also considered that any other wireless forms of communication other than radio frequency signals may be used to allow an RFID card to be accessed by an RFID reader. Such forms of wireless communication can include, without limitation, optical communication.

Figure 9:
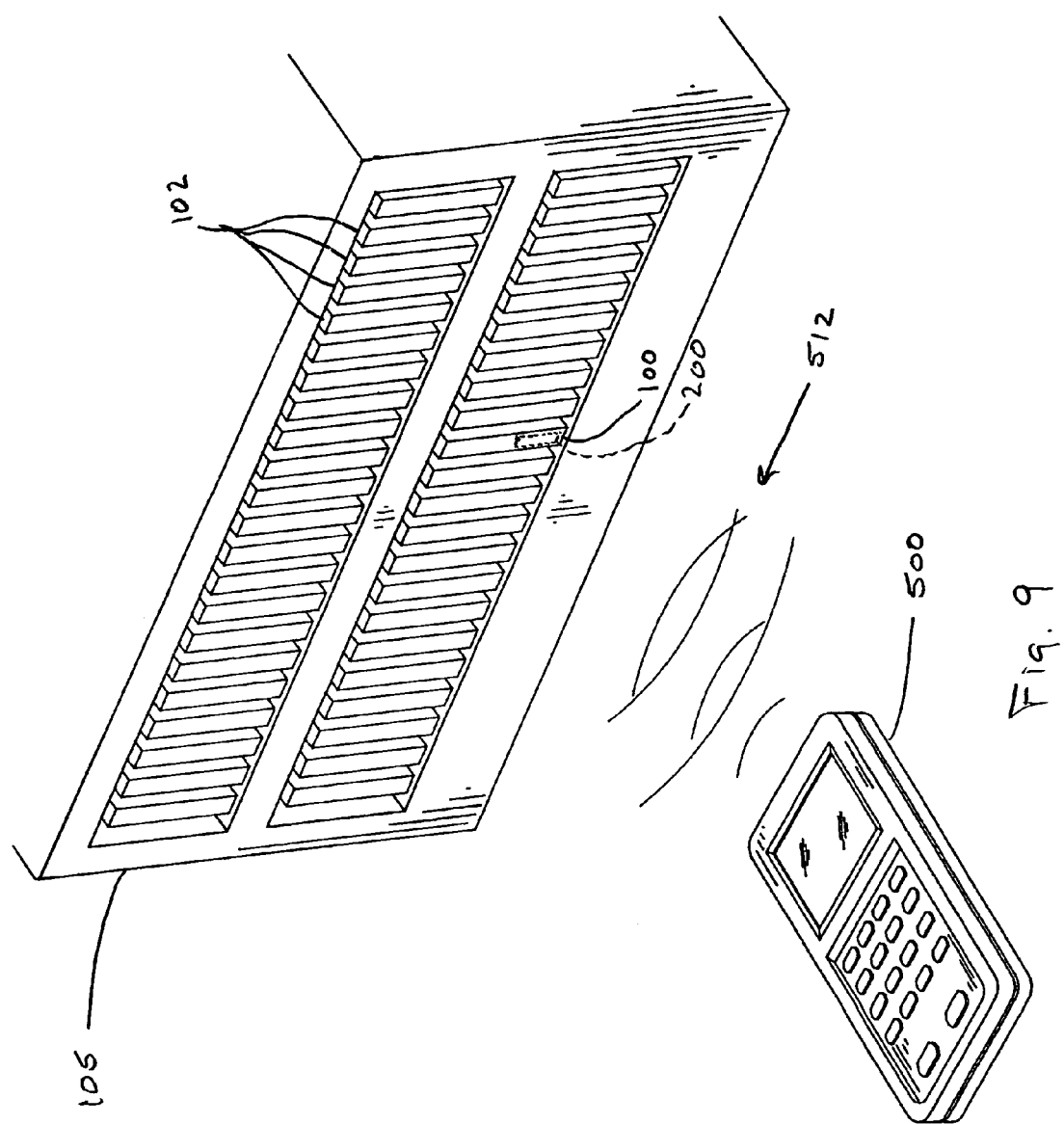
FIG. 9 is a diagram of a hand-held device including a supplemental memory card reader using radio frequency signals to read a supplemental memory of a holographic storage cartridge stored in a cartridge warehouse in accordance with the present invention.

A supplemental memory, such as included in RFID card 200, located in a storage cartridge, such as storage cartridge 100, may also be employed in applications other than those involving a single cartridge disk drive, such as disk drive 300. For example, it is considered that a supplemental memory be read by a hand-held reader. FIG. 9 illustrates a hand held RFID reader 500 reading data via RF signals 512 off RFID card 200 located in holographic storage cartridge 100 which may be located in a warehouse 105 of holographic storage cartridges 102 similar to cartridge 100. Hand held RFID readers are well known in the art and available, for example, from Opticon, Inc. of Orangeburg, N.Y. under the designation PHL-2700 RFID. By using hand held RFID reader 500, the contents and state of media 112 in cartridge 100 can be determined without inserting cartridge 100 into a holographic disk drive or other readout device. This allows an inventory of the media currently available in a storage library or warehouse 100 or on shelves outside of a warehouse to be obtained without excessive handling of the media. Searches for specific volumes or data in a cartridge, such as cartridge 100, can be executed without physically accessing a cartridge. This can reduce data search and access times in warehousing and large data store applications. For example, handheld RFID reader 500 is used to read identification information from a plurality of holographic storage cartridges 102. Each cartridge preferably includes an RFID card such as RFID card 200 shown in FIG. 3. As discussed below in detail, the memory portion of each RFID card can include a keyword field having a keyword which provides some identification information for the data contained in the holographic media of a cartridge 102. For example, short descriptions of video clips or keywords or dates to help determine if the media has the desired information.

Figure 10:
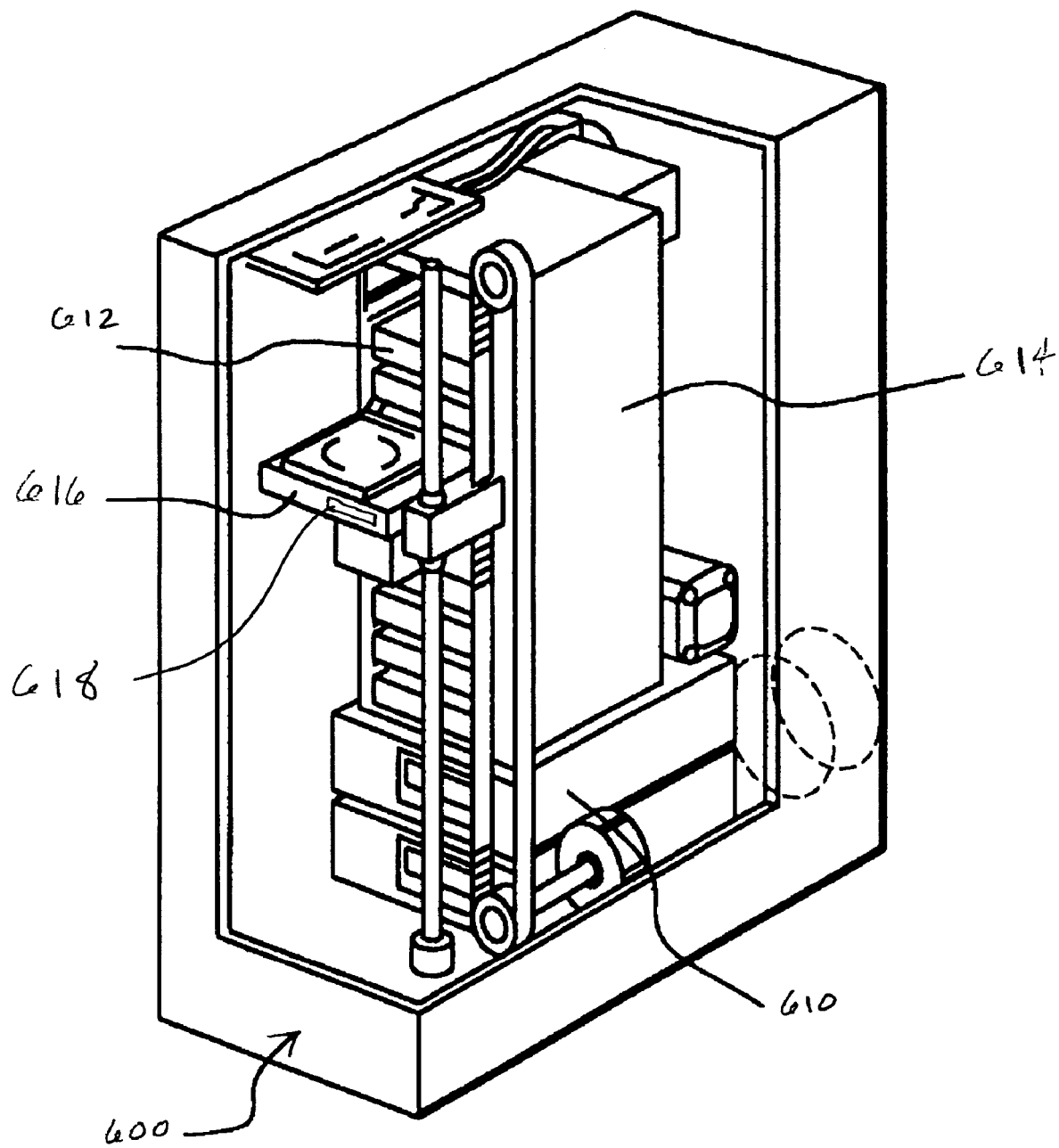
FIG. 10 is a diagram of a jukebox including a supplemental memory storing a plurality of holographic storage cartridges including a supplemental memory card reader for reading a supplemental memory of each storage cartridge in accordance with the present invention.

It is also considered that an RFID card and reader be used in a jukebox application. FIG. 10 illustrates a jukebox 600 for storing and reading holographic storage cartridges 612. Such jukeboxes are well known in the art and include at least one holographic disk drive 610, a conveyor mechanism 614 and tray 616 for transporting selected cartridges from a storage location to disk drive 610. Holographic storage cartridges 612 can be substantially the same as storage cartridge 100 discussed above, and include an RFID card (not shown) such as RFID card 100, also discussed above. In the embodiment shown, tray 616 includes an RFID reader 618, which can be substantially the same as RFID reader 230 discussed above. As is understood in the art, in operation, tray 616 is driven along a stack of cartridges 612 by conveyor mechanism 614. When a specific cartridge is desired to be read, a jukebox controller (not shown) directs tray 616 to remove the cartridge from the stack and place it in disk drive 610 to be read. By including an RFID card in each cartridge 612 and an RFID reader in tray 616, an inventory of the media available in jukebox 600 can be obtained without inserting a cartridge 612 into disk drive 610. This can simplify inventory and management of cartridges in jukebox 600 as searches for specific volumes or data, as well as the state media (e.g. full or not), can be determined without placing a cartridge 612 into disk drive 610.

Exemplary Volume Directory Structure

Table 1 below illustrates an exemplary directory structure that may be stored in the memory section of the RFID card in accordance with the present invention.

TABLE 1

Volume Directory Definition

| Structures | Field | Size | |
|---|---|---|---|
| Basic Information | Volume Directory ID | 32 | bits |
| | Volume Directory Length in Bytes | 16 | bits |
| | Volume Directory Revision | 8 | bits |
| | Volume Directory Sequence Number | 8 | bits |
| | Total Bytes in this portion of the Volume Directory | 32 | bits |
| | Address Pointer to Media Based Volume Directory | 32 | bits |
| | Pointer to Redundant Copy of Media Based Volume Directory | 32 | bits |
| | Pointer to Previous Media Based Volume Directory | 32 | bits |
| | Format Generation | 8 | bits |
| | Media Geometry Code | 8 | bits |
| | Media Formulation Code | 8 | bits |
| | Media Status | 8 | bits |
| | Volume ID Size | 8 | bits |
| | Volume ID Field | 256 | Bytes |
| | Overall Drive Statistics Size | 8 | bits |
| | Overall Drive Statistics Field | 256 | Bytes |
| | Security/Copyright Information | 32 | Bytes |

TABLE 1-continued

Volume Directory Definition

| Structures | Field | Size | |
|---|---|---|---|
| | Overall Search Key Size | 16 | bits |
| | Search Key Fields | 1024 | Bytes |
| | Media Map Location | 8 | bits |
| | Pointer to Most Recent Media Map | 32 | bits |
| | Next Appendable Address | 23 | bits |
| | Volume Directory CRC | 16 | bits |

Below are further explanations for the volume directory fields.

The Volume Directory ID is a unique pattern to identify the start of the volume directory structure.

The Volume Directory Length is the length in bytes from the start of the volume directory through volume directory cyclic redundancy code, which is for error checking and appears at the end of the directory.

The Volume Directory Revision is the version of this volume directory header.

The Volume Directory Sequence Number starts at 0 and is incremented each time the Volume Directory is updated.

The Total Bytes in This Portion of the Volume Directory is the number of bytes beginning with the volume directory ID field that are included in this structure including all attached media map information. As is well understood in the art, media map information provides the actual physical coordinates of data on the media. This field is used in case all of the information cannot fit in the supplemental memory and some information must be placed on the media.

The Address Pointer to Media Based Volume Directory points to the area where the current volume directory information is repeated in full if the volume directory and media map do not fully fit in the supplemental memory. It is a physical address on the media specifying the coordinates of the data.

The Pointer to Redundant Copy of Remainder of the Volume Directory is provided so that if desired, two copies of the volume directory may be written to the media in different locations on the media. This is also a physical address.

The Pointer to Previous Media Based Volume Directory: It is considered that the supplemental memory contains directory information that includes a volume directory having a full or partial media map. It is also considered that the supplemental memory contain directory information that contains just pointers to locations on the media where a volume directory containing a full media map are located. If there are volume directories written on the media, a new version is written after each write session. This field points to the location of the media where the previous volume directory is located. This allows the drive to examine old volume directories for a history of how the media has been written.

The Format Generation field provides a definition of the format implementation for the media and directory.

The Media Geometry Code provides physical information about the media not including its formulation. Items encoded in this can include, without limitation, disk versus coupon, in a cartridge or not, if it has an addressing servo pattern and, if so, what kind/version, substrate type, and guard bands.

The Media Formulation Code provides information about the media formulation. The formulation information can include, without limitation, thickness of the media, formulation type, write once versus rewritable, and any other information needed to determine capacity, write schedules, and cure times.

The Media Status indicates if the media has never been written, is partially written, is appendable, full, or write protected. Table 2 below indicates how this field is encoded.

TABLE 2

MEDIA STATUS BYTE DEFINITION

| 7 | 6 | 5 | 4 | 3 | 2 | 1 | 0 |
|---|---|---|---|---|---|---|---|
| Formatted | Secure | Reserved | | | Status | | |

If the Formatted field is 0, then the disk is unformatted and if the Formatted field is 1 then the disk is formatted. If the Secure field is 0 then anyone can read the disk and if the Secure field is 1 the some security policies will be used to determine readability of the data.

The Status Field provides the current overall status of the media as follows:

0=Empty—never been used

1=Appendable—Has been written and can still be added to

2=Write Protected—User has write protected the cartridge

3=NonAppendable—Some recovery error or write timeout occurred on the media and it can no longer be written to. It is not full and may not be cleanly finished.

4=Full—Media has been written to capacity and cured

The Volume ID Size is the Number of bytes in the volume ID field.

The Volume ID is an ASCII string created by the user to identify the volume. This field preferably has a maximum length of 256 bytes. It may be may shorter, or zero, however.

The Overall Drive Statistics Size is the number of bytes in the drives statistics field (below). The maximum size is preferably 256 bytes, but may be shorter.

The Overall Drive Statistics Field maintains overall stats like serial numbers for the drives that have written the media and can include, without limitation, the number of read/write/load/unload cycles, and time parameters that may help determine overall media life.

The Security/Copyright Information field can be used for secure access via passwords and encrypted security key codes and to keep track of copyright protection. It may be used to prevent unauthorized reading and/or copying of the data.

The Overall Search Key Size is the number of bytes in the search key fields (discussed below).

Search Key Fields: Multiple search keys can be located here to allow for a quick way to determine what specific data resides on the media. This can be any type of metadata that is specific to an application. An example is short descriptions of video clips or keywords or dates to help determine if the media has the desired information. The field definitions are defined by the format generation.

Media Map Location: As is understood in the art, the media map provides a detailed mapping between host logical blocks and physical structures on the media. It may reside in the supplemental memory directly succeeding the volume descriptor or it may be located on the media. A detailed description of an exemplary media map is provided below. The defined values are:

0=No Map

1=Map directly succeeds this volume descriptor

2=Map is on the media

The Pointer to Most Recent Media Map field allows the drive to find the media map. The meaning of the field depends on the map location field as follows:

If there is no map, this field=0.

If the map follows the volume directory, this is the number of bytes from the start of this volume directory to the start of the map.

If the map is on the media, this is the physical address of the most recent map written.

Volume Directory CRC—This CRC covers the full structure of the fields listed in Table 1. It is a CRC-16 format with polynomial $x^{15}+x^2+1$. If this fails, it is assumed this copy of the volume directory is bad.

An exemplary definition of a media map is shown below in Table 3.

TABLE 3

Media Map Definition

| Structures | Field | Size |
|---|---|---|
| Media Map Header | Media Map ID | 32 bits |
| | Media Map Header Length in Bytes | 8 bits |
| | Media Map Revision | 8 bits |
| | Media Map Starting Book Address | 32 bits |
| | Total Number of Entries in Media Map | 16 bits |
| | Size of each Media Map Entry | 16 bits |
| | Media Map Header CRC | 16 bits |
| Media Map Entries (1 per physical address) | Media Map Entry Header | 16 bits |
| | Status Byte | 8 bits |
| | Reserved | 8 bits |
| | Physical Book Address | 32 bits |
| | Number of Holograms written at this physical address | 16 bits |
| | Hologram number of the start of the first new logical block address at this physical address. | 16 bits |
| | First Logical Block Address starting at this physical address | 32 bits |
| Media Map Footer | CRC over entire Media Map structure | 16 bits |

Further description of each field appears below.

Media Map Header Definitions:

The Media Map ID is a unique pattern that identifies the start of a media map data structure.

The Media Map Header Length in Bytes is the number of bytes in the media map header including the ID and CRC.

The Media Map Revision is the Revision number of this media map.

The Media Map Starting Book Address is the first physical book address that has a media map entry contained in this media map structure. There may be multiple media map structures used to describe all of the written media. An example would be for multi-session writes where a new media map structure is created each time a write session is completed.

The Total Number of Media Map Entries is the number of Media Map entries that immediately follow the Media Map Header structure.

The Size of Each Media Map Entry is the Size in bytes of each Media Map entry that follows.

The Media Map Header CRC is a 16 bit CRC of the Media Map header to check the validity of the contents. This is the same CRC method used for the Volume Directory structure.

Media Map Field Definitions:

The Media Map Entry Header identifies the start of a Media Map entry.

The Media Map Status Byte describes the status and contents of the information at this physical address as shown below in Table 4.

TABLE 4

| | Bit | | |
|---|---|---|---|
| | 7(msb)-5 | 4-3 | 2-0 (lsb) |
| Def | Reserved = 0 | Density | Status |

Density:
0 = Written at full density for this format type.
1 = Written at low density for this format type.
2-3 = Reserved
Status:
0 = Unused/Unexposed
1 = Partially Filled
2 = Fully Filled/Cured
3 = Mapped Out - Bad The Physical Address is the address of the media being described by this entry.

The Number of Holograms Written at this Physical Address is the number of data holograms recorded at this address. This does not include filler data used to used up the media's capacity at this address. This allows for a variable number of holograms to be written at each physical location.

The Hologram Number of the Start of the First New Logical Block Address at this Physical Address is the first hologram number at this physical address containing data that starts a new logical block address. The logical block address is the address requested by the host for reading.

The CRC For Entire Media Map Structure is a 16 bit CRC over the entire Media Map including the header and all media map entries. The same CRC polynomial is used as for the Volume Directory. The Media Map is invalid if the CRC fails.

It is to be understood that the exemplary directory structure discussed above and shown in Tables 1, 2 and 3 is only one example of a directory structure that may be used in implementation of the present invention. Any type of directory structure that provides information about the location of data on corresponding holographic media is contemplated for use with the present invention. For example, the directory structure discussed above uses pointers to indicate the location of a full media map located on the holographic media. A full or partial media mapping table may also be included in the RFID memory section.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. Many other variations are also to be considered within the scope of the present invention.

What is claimed as new and desired to be protected by Letters Patent of the United States is:

1. A holographic data storage device including:
   holographic media for containing data, writing data to and reading data from;
   at least one supplemental memory for containing at least a first portion of a directory of the data contained in the holographic media.

2. The device of claim 1 wherein a second portion of the directory of the data contained on the holographic media is included on the holographic media.

3. The device of claim 2 wherein the first portion of the directory includes pointers to holographic media map information on the holographic media.

4. The device of claim 1 wherein the first portion of the directory includes holographic media map information.

5. The device of claim 1 wherein the first portion of the directory contains security information.

6. The device of claim 1 wherein the first portion of the directory contains identification information for the holographic media.

7. The device of claim 1 wherein the supplemental memory includes an EEPROM.

8. The device of claim 7 wherein the supplemental memory may be wirelessly accessed.

9. The device of claim 8 wherein the supplemental memory may be accessed via radio frequency signals.

10. The device of claim 7 wherein the supplemental memory is accessed via electrical contacts.

11. The device of claim 1 wherein both the holographic media and the supplemental memory are included in a cartridge.

12. The device of claim 11 including a holographic disk drive having a supplemental memory reader/writer, wherein the supplemental memory may be accessed by the supplemental memory reader/writer.

13. The device of claim 11 wherein the supplemental memory may be wirelessly accessed by the supplemental memory reader/writer.

14. The device of claim 13 wherein the supplemental memory may be accessed by radio frequency signals.

15. The device of claim 11 including a hand-held supplemental memory reader/writer wherein the supplemental memory may be accessed by the hand-held supplemental memory reader/writer.

16. The device of claim 11 including a plurality of holographic storage cartridges stored in a jukebox including a supplemental memory reader/writer wherein each of the plurality of holographic storage cartridges includes a supplemental memory which may be read by the supplemental memory reader/writer.

* * * * *